Figure 1:
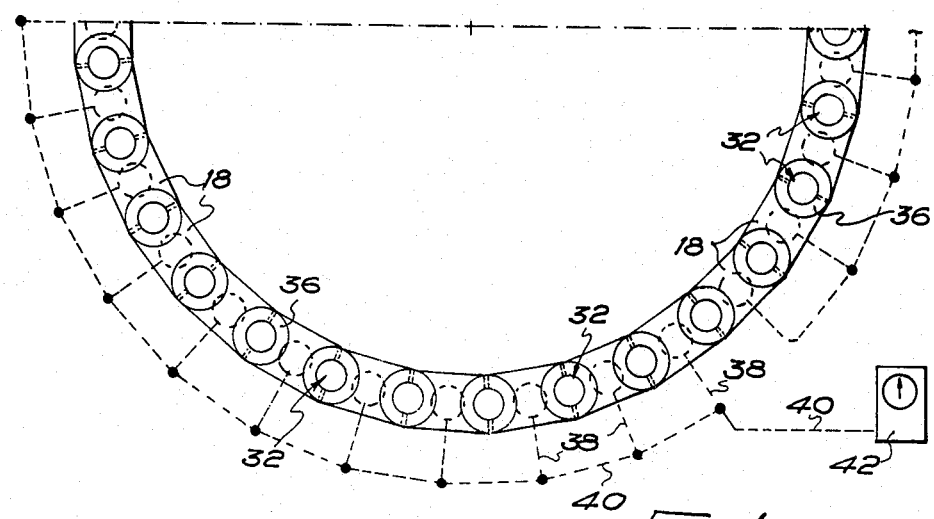

United States Patent [19]

Stansfield et al.

[11] 3,917,224
[45] Nov. 4, 1975

[54] BOLT TIGHTENING APPARATUS

[75] Inventors: Fred Stansfield, Oldham; Michael James Roe, Birmingham, both of Great Britain

[73] Assignee: Doncasters Moorside Limited, Oldham, England

[22] Filed: Apr. 30, 1974

[21] Appl. No.: 465,531

[30] Foreign Application Priority Data
Feb. 18, 1974 United Kingdom................. 7194/74

[52] U.S. Cl.............................................. 254/29 A
[51] Int. Cl.²........................................ E21B 19/00
[58] Field of Search.............. 254/29 A; 29/452; 81/57,38

[56] References Cited
UNITED STATES PATENTS
1,872,115  8/1932  Byerlein................. 29/452
3,338,552  8/1967  Persicke.................. 254/29 A
3,362,682  1/1968  Meschonat................ 254/29 A

*Primary Examiner*—Al Lawrence Smith
*Assistant Examiner*—Robert C. Watson
*Attorney, Agent, or Firm*—Sherman H. Barber

[57] ABSTRACT

A apparatus for pre-tensioning a series of screwthreaded fasteners by means of apparatus including a yoke member adapted to be supported midway of its length above a single fastener by way of a single hydraulic piston and cylinder arrangement, the opposite ends of said yoke member being adapted to apply pretensioning forces to the pair of fasteners flanking said single fastener by way of adaptors applied to said pair of fasteners.

3 Claims, 5 Drawing Figures

BOLT TIGHTENING APPARATUS

The invention relates to bolt tightening apparatus and has for its object to provide an improvement therein.

It is well known to pre-tension bolts and studs of, inter alia, steam turbine casing assemblies before restraining nuts are finally tightened in position so that, when the pre-tensioning means are released, stress is transferred to said bolts or studs, as the case may be, whereby the assembly concerned is very tightly bolted together. The same means have been employed when it has been required to loosen the bolts or studs, the latter having been stretched before any attempt has been made to slacken off the restraining nuts. One way in which this has previously been done has involved the use of a bridge member and means for supporting the bridge member on the two bolts or studs flanking one end of a bolt or stud which is to be pre-tensioned. However, by these means it will be understood that it has only been possible in a single operation to pre-tension every third bolt or stud in a series of such bolts or studs even if a series of such bridge members have been used.

According to one aspect of the invention, there is provided a method of pre-tensioning a series of bolts or studs, the method including the step of applying a tension to a pair of said bolts or studs by means of a yoke member supported above a single bolt or stud between said pair of bolts or studs. Preferably, the method will involve the use of a plurality of such yoke members, each adjacent pair of yoke members contributing to the pre-tensioning of a bolt or stud disposed between them and in this way it is possible in a single operation to pre-tension alternate bolts or studs. In a method of pre-tensioning all the bolts or studs around a circular flange, a ring of such yoke members may be constructed, supported above alternate bolts or studs, so that the remaining bolts or studs can be pre-tensioned and then tightened, in which case a single re-positioning of said yoke members will then be required so that they can then be supported on said remaining bolts or studs for the previously un-tightened bolts or studs to be pre-tensioned and tightened.

According to another aspect of the invention, there is provided a bolt or stud tensioning apparatus including at least one yoke member adapted to be supported midway of its length above a single bolt or stud by way of a single hydraulic piston and cylinder arrangement and the opposite ends of said yoke member being so shaped that they can apply pre-tensioning forces to the pair of bolts or studs flanking said single bolt or stud by way of adaptors applied to said pair of bolts or studs. The apparatus will preferably include a plurality of such yoke members, the opposite ends of each yoke member being so shaped that an adjacent pair of such yoke members can act against a single bolt or stud disposed between them by way of an adaptor applied to it. For this purpose said yoke members may be provided with grooves running down their opposite ends for engagement with the adaptors applied to the bolts or studs.

According to a still further aspect of the invention, there is provided, in combination, a plurality of yoke members as described above and a plurality of adaptors for connection to the bolts or studs which are to be pre-tensioned, the opposite ends of said yoke members being so shaped that they can be engaged with the adaptors. Preferably, the opposite ends of said yoke members will be so shaped that an adjacent pair can be engaged with a single adaptor disposed between them, as for example by having grooves running down their opposite ends.

Figure 2:
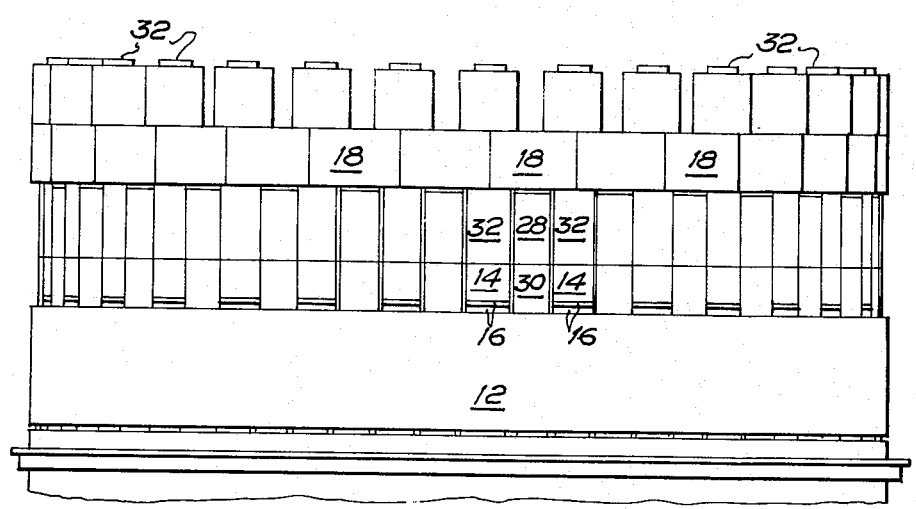
Figure 3:
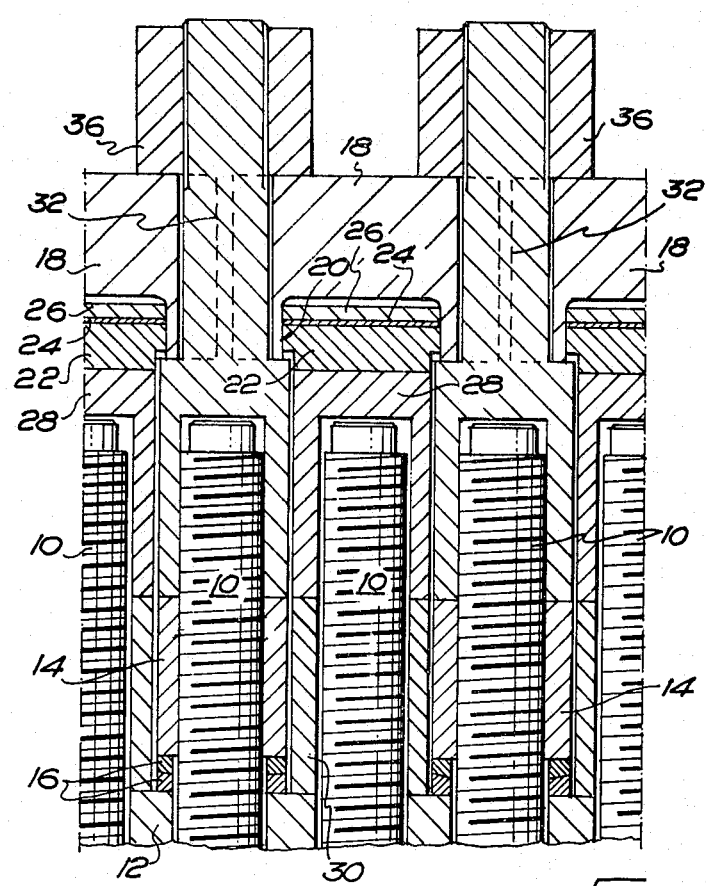
Figure 4:
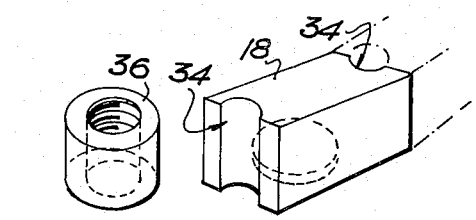
Figure 4:
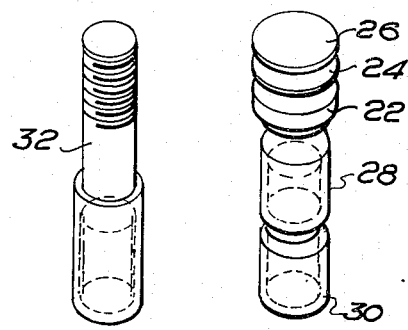
Figure 5:
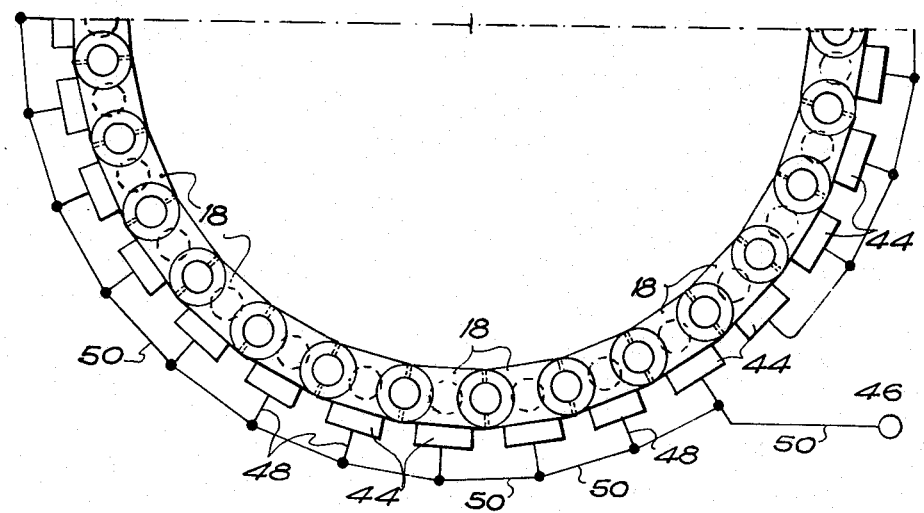

In order that the invention may be fully understood and readily carried into effect, the same will now be described, by way of example only, with reference to the accompanying drawings, of which:

FIG. 1 is a plan view of bolt or stud tensioning apparatus embodying the invention in position on a ring of studs of a pressure vessel, FIG. 2 is a side view thereof, FIG. 3 is a sectional developed side view through several of the studs and the tensioning apparatus associated therewith, FIG. 4 is an exploded view of the component parts of the tensioning apparatus, and FIG. 5 is a view similar to FIG. 1 which illustrates an alternative method of operating the apparatus to produce a tension in the bolts or studs.

Referring now to the drawings, FIGS. 1, 2 and 3 show a plurality of studs 10 extending through the flange 12 of a pressure vessel and provided with restraining nuts 14 and pairs of concave washers 16 through which tightening forces are to be transmitted to the flange. (Alternate studs are shown in FIG. 3 to be provided with the nuts and washers and the remaining studs are shown to be associated with the tensioning apparatus).

The tensioning apparatus includes a plurality of yoke members 18 each one of which is adapted to be supported midway of its length above a single one of the studs by way of a single hydraulic piston and cylinder arrangement constituted by a shallow cylinder 20 machined in the underside of the yoke member, a piston 22, a PTFE disc 24 overlying the piston, and a rubber sealing member 26 overlying said disc. The piston is shown to act against a so-called cap spacer 28 and a cylindrical spacer 30 which abuts against the flange 12 (the spacer 30 being the same depth as a nut 14). The opposite ends of each yoke member are so shaped that it can apply pre-tensioning forces to the pair of studs flanking the single stud on which it is supported, by way of adaptors 32 which are screwed down on said studs, overlying the nuts 14. In fact, as best seen in FIG. 4, the shaping of each yoke member with grooves 34 running down its opposite ends enables an adjacent pair of yoke members to be engaged with a single adaptor 32 disposed between them as shown in FIG. 3 with a screwthreaded abutment member 36 with which the adaptor 32 is provided overlying a part of each. Thus it will be seen that the pair of yoke members contributes to the pre-tensioning of the stud disposed between them.

The arrangement is such that, as shown in FIGS. 1 and 2, a ring of yoke members can be constructed, supported on alternate studs, so that the remaining studs can be pre-tensioned and then tightened. It will be seen that in this case a single re-positioning of said yoke members will then be required so that they can then be supported on the already tightened studs (the cap spacers 28 against which the pistons act then being mounted directly upon the already tightened nuts 14 instead of upon the spacers 30) for the pre-tensioning and tightening of the first mentioned alternate studs.

It will of course be understood that it is preferable for all the hydraulic piston and cylinder arrangements to be connected together in a common hydraulic circuit so that all the studs being pre-stressed at that time are pre-stressed equally. It will be understood that when the yoke members have been re-positioned in readiness for the pre-tensioning and tightening of the first mentioned alternate studs, it is important that the same hydraulic pressure as before is established in the piston and cylinder arrangements forming part of the stud tensioning apparatus so that the second set of studs being pre-stressed are pre-stressed by exactly the same amount as the first set.

In FIG. 1 it will be seen that all the hydraulic piston and cylinder arrangements are connected together by means of conducts 38 and 40 and that they can all be pressurised by means of a common pump 42. In FIG. 5, however, there is illustrated an alternative arrangement in which respective air powered pumps 44 are associated with the yoke members 18 for pressurising the piston and cylinder arrangements thereof, said air powered pumps being connected together and to a common source 46 of air under pressure by way of conduits 48 and 50.

Various modifications may be made without departing from the scope of the invention. For example, instead of the opposite ends of the yoke members being provided with grooves running down their opposite ends for engagement with the adaptors 32 they could be extended, that is to say each could be longer than shown in FIG. 4, and plain holes could extend through them for the reception of the adaptors 32. In this case, however, the yoke members would be arranged in an alternately staggered formation, that is to say alternate yoke members would overlie the edge portions of the remaining yoke members for each adaptor 32 to extend through the two yoke members and of course alternate cap spacers 28 would require to be of different lengths.

We claim:

1. Apparatus for tensioning a plurality of screwthreaded fasteners, wherein the improvement comprises:
   a. pairs of screwthreaded fasteners disposed in flanking relation to respective intermediary fasteners;
   b. first means coacting with each one of said flanking fasteners for applying a tensile force to each flanking fastener;
   c. a plurality of yoke members coacting with said first means and supported above said intermediary fasteners to exert tensile forces on pairs of fasteners flanking said intermediary fasteners;
   d. second means for maintaining said yoke members in such coacting relation with said first means;
   e. abutment means overlying respective intermediary fasteners and disposed to support said yoke members above said intermediary fasteners; and
   f. third means coacting with said yoke members and with said abutments and creating forces in said yoke members that coact with said first means and thereby exert tensile forces in said flanking fasteners.

2. Apparatus for tensioning a plurality of screwthreaded fasteners, wherein the improvement comprises:
   a. pairs of screwthreaded fasteners disposed in flanking relation to intermediary fasteners;
   b. an adaptor threaded onto each flanking fastener;
   c. a plurality of yoke members coacting with the adapters threaded onto the respective pairs of flanking fasteners to exert tensile forces on said pairs of flanking fasteners;
   d. means securing said yoke members in such coacting relation;
   e. abutment means overlying said intermediary fasteners and disposed to support said plurality of yoke members above said intermediary fasteners;
   f. respective hydraulic piston and cylinder arrangements coacting with said yoke members and with respective abutment means and creating forces in said yoke members that exert tensile forces in said flanking fasteners; and
   g. means for actuating said hydraulic piston and cylinder arrangements for applying equal tensile forces in said falnking fasteners.

3. The invention of claim 1 including:
   a. means for exerting equal forces on said yoke members so that all flanking fasteners receive equal tensioning forces.

* * * * *